Sept. 12, 1961 W. F. HUCK 2,999,690
BOWLING PIN CHANGING MECHANISM
Filed Feb. 28, 1957 2 Sheets-Sheet 1
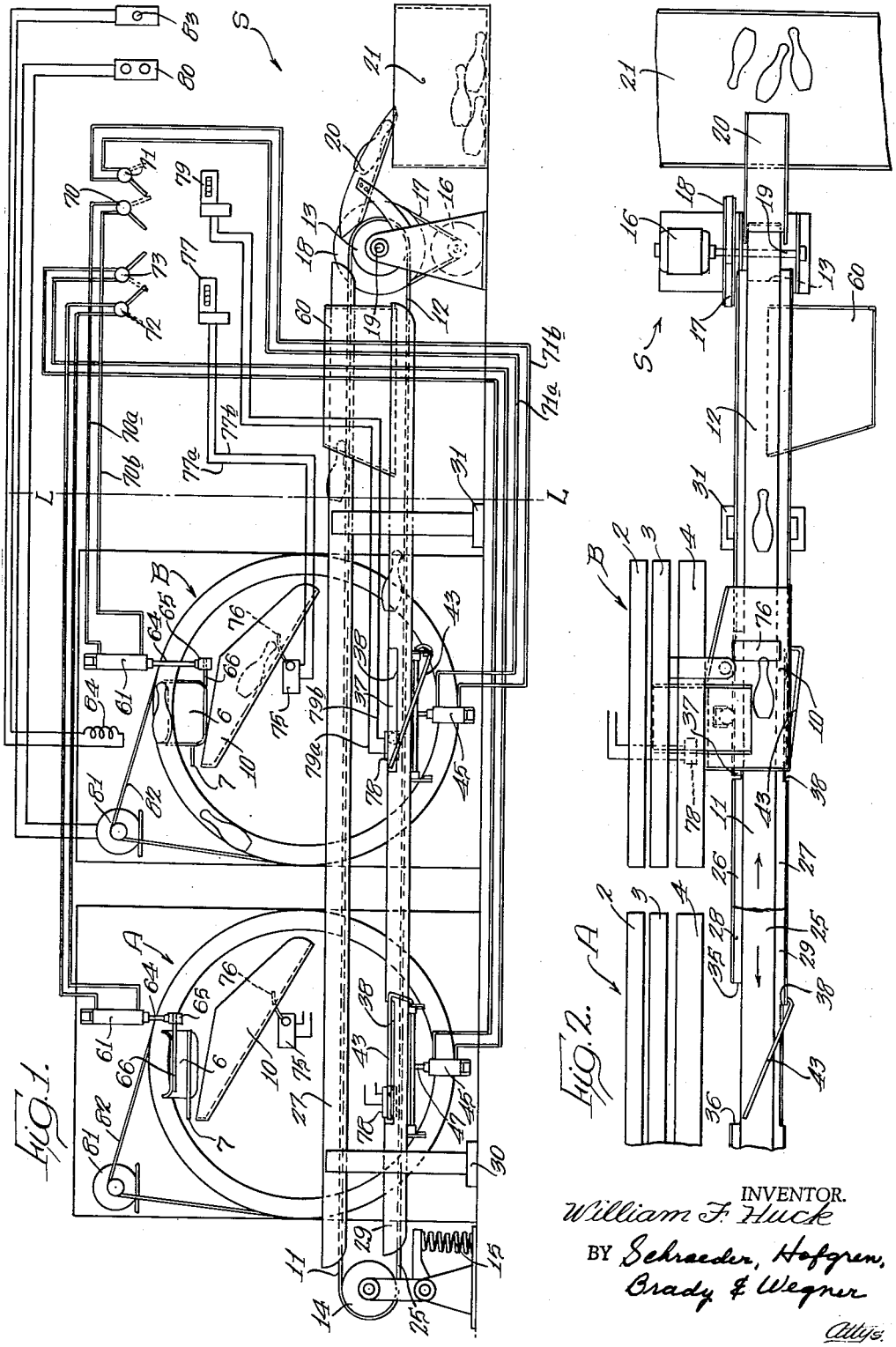
INVENTOR.
William F. Huck
BY Schroeder, Hofgren,
Brady & Wegner
Attys.

Sept. 12, 1961 W. F. HUCK 2,999,690
BOWLING PIN CHANGING MECHANISM
Filed Feb. 28, 1957 2 Sheets-Sheet 2
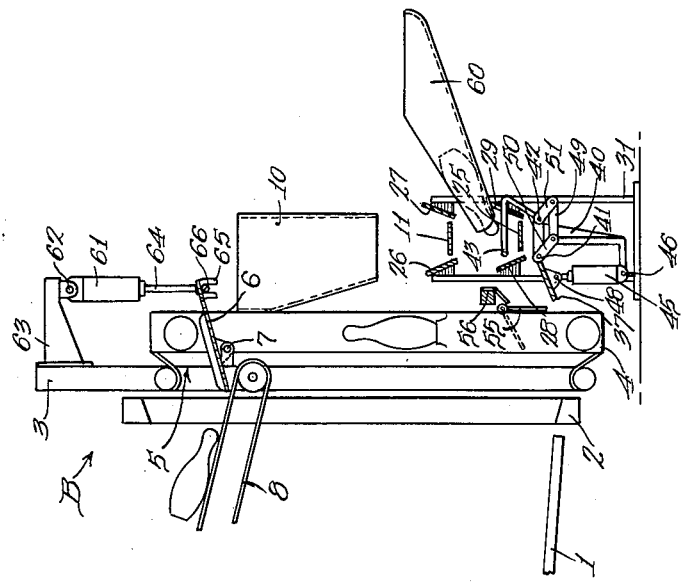
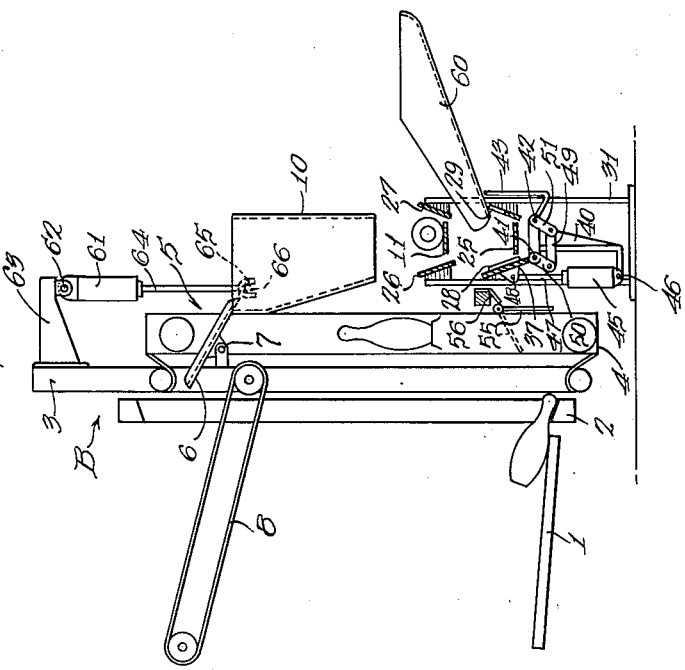
INVENTOR.
William F. Huck
BY Schroeder, Hofgren,
Brady & Wegner
Attys.

United States Patent Office 2,999,690
Patented Sept. 12, 1961

2,999,690
BOWLING PIN CHANGING MECHANISM

William F. Huck, Forest Hills, N.Y., assignor, by mesne assignments, to The Brunswick Automatic Pinsetter Corporation, Paramus, N.J., a corporation of Delaware
Filed Feb. 28, 1957, Ser. No. 643,157
12 Claims. (Cl. 273—43)

This invention relates to pin handling mechanism for use with pinsetting machines, and more particularly to pin changing mechanism and parts thereof for changing sets of pins used in the machine.

A bowling alley proprietor normally has several different sets of pins that may be used for bowling, and he varies the set used, depending upon whether the alleys are being used in league play, or in open play. Also, certain leagues will have sets of pins for their use only. In any case, it is frequently required that the pins must be changed once, and sometimes several times, during a single day's operation. An automatic pinsetter will normally operate with an average of 20 pins, and, since each pin weighs about 3 pounds, a total of approximately 120 pounds of pins per machine would have to be handled in order to change pins. With the advent of automatic pinsetters, the manpower available for changing pins is now greatly reduced, and it has generally resulted in having pins stacked up in boxes or racks behind the alleys adjacent the machines occupying valuable space and frequently obstructing the passage of attendants.

An object of this invention is to provide new and improved mechanism for changing pins used in a pinsetting machine.

Another object of this invention is to provide pin changing mechanism for use with pinsetting machines in which out-of-use pins may be stored in a remote storage area common to a plurality of machines.

A further object of this invention is to provide pin changing mechanism comprising means for discharging pins out of and into one or more pinsetting machines and a pin transport mechanism extending along the rear of the machines for carrying pins away from the machine to a storage area and for carrying pins from a storage area to the machine.

Another object of this invention is to provide pin changing mechanism for a pinsetting machine having a ring-shaped, pin-elevating member extending across the rear thereof including a movable diverter for receiving pins discharged in the plane of said elevator and for directing pins rearwardly out of the machine, a pin transport mechanism for carrying pins toward and away from the machine, and means for discharging pins from the transport mechanism into the plane of the elevator.

An additional object of this invention is to provide a pin transfer-out mechanism for use with a bowling pinsetting machine having a ring-shaped pin elevator extending across the rear thereof including a pin transport conveyor, means for discharging pins out of the machine to said conveyor comprising a movable pin diverter having downwardly and rearwardly inclined positions within the periphery of the pin elevator, and manual control means in the storage area to which pins are taken by the conveyor for positioning said diverter.

A still further object of this invention is to provide a pin changing mechanism for use in an establishment having a plurality of pinsetting machines each having pin elevating mechanism at the rear thereof and a pin storage area remote from the machines comprising an endless conveyor extending from said area and along the rear of the machines, a chute in said area for directing pins onto the lower flight of the conveyor traveling away from the area, means in said area for receiving pins discharged from the upper flight of the conveyor traveling toward the area, means associated with each machine for discharging pins therefrom including a pivotally mounted diverter, a chute for guiding pins from the diverter to the upper conveyor flight, a piston and cylinder device for positioning the diverter, means associated with each machine for discharging pins from the lower conveyor flight into the machine including a pin deflector movable to a position extending across the lower flight of the conveyor, a piston and cylinder device for moving the pin deflector to said position, means associated with each machine including control valves in the storage area for operating the piston and cylinder devices, and counting means associated with each machine including indicators in the storage area for counting pins entering and leaving each machine.

The objects of the invention generally set forth together with other ancillary advantages are attained by the construction and arrangement shown by way of illustration in the accompanying drawings, in which:

FIG. 1 is a rear elevation of a bowling alley installation looking toward the rear of the automatic pinsetting machines with parts of the mechanism shown diagrammatically;

FIG. 2 is a plan view of the installation shown in FIG. 1 with some parts removed and parts shown diagrammatically;

FIG. 3 is a side elevation of a pinsetting machine shown diagrammatically with parts of the pin changing mechanism shown in section and with the mechanism shown in pin transfer-out position; and FIG. 4 is a view similar to FIG. 3 but with the pin changing mechanism shown in pin transfer-in position.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

For purposes of illustration the pin changing mechanism has been shown in conection with a pinsetting machine, and more particularly the pin handling mechanism of an automatic pinsetting machine which may be similar to that disclosed in the application of William F. Huck and Alexander J. Albrecht, Serial No. 534,726, filed September 16, 1955, now Patent No. 2,967,708. A suitable pin handling mechanism is disclosed in detail in said application and this mechanism will be only generally referred to herein.

In this application, as shown in FIGS. 3 and 4, a pit conveyor 1 operates to discharge pins and a bowling ball rearwardly therefrom, and the ball may be elevated along a pair of tracks (not shown) disposed within the periphery of a rotatable ball elevating ring 2. The ball elevating ring is rotatably supported from an annular frame 3 through which the pins may pass to a ring-shaped pin elevator 4 which has spaced-apart pockets formed internally thereof for elevating pins to a discharge station indicated generally at 5, where a pin may drop from a pocket onto a pin diverter 6 which may be in the form of a tray and which, as shown in FIG. 4, is positioned to direct pins forwardly onto a cross conveyor 8 which may lead to mechanism for distributing pins into playing arrangement and for setting pins on an alley bed. The pin diverter member 6 is pivotally mounted on the frame 3 by means, such as a pin 7, and may move from the pin forwarding position shown in FIG. 4 to a downwardly and rearwardly inclined position shown in FIG. 3. In FIG. 3, the diverter member lies within the periphery of the ring-shaped pin elevator 4 for receiving pins in their normal path of travel and transfers out pins onto a chute 10 which overlies an upper flight 11 of a pin transport conveyor.

The pin transport conveyor is in the form of an endless belt 12 (FIG. 1) traveling about a conveyor drive pulley 13 and an idler pulley 14 movably mounted and urged in a direction to maintain the belt taut by a spring 15. The belt 12 may be driven by a motor 16, a drive belt 17, and a driven pulley 18 on a shaft 19 common to the conveyor pulley 13. The conveyor belt 12 is driven so as to have the upper flight 11 travel toward the right, as viewed in FIGS. 1 and 2, to transport pins transferred out of use into a pin storage area which, as shown, may have a chute 20 formed to direct pins into a movable box 21. The pin storage area indicated generally at S contains the mechanism shown in FIG. 1 lying to the right of a line L—L, and the area S may be at the end of a line of pinsetting machines, two of which are shown at A and B in FIGS. 1 and 2, or may be at any desired distance from the machines.

The conveyor belt 12 has a lower flight 25 which travels in a direction away from the pin storage area S. The upper conveyor flight 11 and lower conveyor flight 25 may each have a supporting frame having pin guiding side walls 26, 27 and 28, 29, respectively, supported by floor mounted supports, such as shown at 30 and 31, suitably fastened to the side walls 26–29, inclusive.

The pin guiding side wall 28 associated with the lower conveyor flight 25 and located nearest the pinsetting machines A and B is made discontinuous at each machine so as to form an opening having edges 35 and 36 between which a movable trap door 37 may extend in one position thereof to close the opening and prevent pins from passing out the opening. The other pin guiding side wall 29 associated with the lower conveyor flight 25 is of a reduced height opposite the trap door 37, as shown at 38, so that a pin deflector 43 may move to a position to deflect pins off the conveyor flight 25 through the opening in the side wall 28. A framework 40 is secured to the side wall supporting frame for the lower conveyor flight 25. The framework 40 journals a pivot shaft 41 for the trap door 37 and also journals a pivot shaft 42 for the pin deflector 43, previously referred to. The pin deflector 43 has an angled length which, as shown in FIGS. 1, 2 and 3, lies to the side of the path of pin travel when the trap door 37 closes the opening in the side wall 28. The trap door 37 may be lowered to the position shown in FIG. 4, and, simultaneously, the deflector 43 is moved to have its angled end lie across the path of pin travel to direct pins through the opening in the side wall 28. With the parts in the position shown in FIG. 4, the trap door 37 forms a shelf along which pins may travel as they are directed into the plane of the ring-shaped pin elevator 4 at the lowest part thereof. The trap door 37 and deflector 43 may be moved by a piston and cylinder device 45 which is pivotally mounted at one end to the frame 40 by a pin 46 and has a piston rod 47 pinned to the reverse side of the trap door, as shown at 48. A motion transmitting link 49 is pivotally connected to arms 50 and 51 connected to the trap door shaft 41 and deflector shaft 42 so as to cause simultaneous movement of the trap door 37 and the deflector 43.

A swinging gate 55 may swing to permit free entry of pins into the pin elevator from the pin transport conveyor but is limited in its rearward swinging movement by a stop 56 to prevent pins from passing rearwardly out of the pin elevator 4 in a normal pin elevating operation.

Each of the pinsetting machines has a trap door and pin deflector structure associated therewith.

A chute 60 in the storage area S may have its discharge end positioned directly over the lower conveyor flight 25 so that pins may be placed on the conveyor flight for transport to one of the pinsetting machines.

The pin diverter 6 may be moved and maintained in either of its position by a piston and cylinder device 61 having its casing pivotally pinned at 62 to an arm 63 extending rearwardly from the upper end of the frame member 3. A piston rod 64 has a forked end 65 in engagement with a rod 66 fastened to the rear end of the diverter member so that lowering movement of the rod 64 will move the diverter 6 to a pin diverting position. The diverter may be urged counterclockwise, as viewed in FIG. 3, by a spring (not shown). The forked connection permits manual tilt of the diverter.

The moving means for the pin diverter member 6 and the trap door 37 and pin deflector 43 may be controlled by manually operable valves located in the storage area where they may be conveniently operated by an attendant. The system, as shown in FIG. 1, has the control valves 70 and 71 associated with the piston and cylinder device 61 for the pin diverter 6 and the piston and cylinder device 45 for the trap door and pin deflector, respectively, by lines 70a, 70b, 71a, 71b. The system may utilize compressed air, and each of the valves has two positions so as to direct air under pressure to either the lower or upper side of the associated cylinder for obtaining the desired position of the member or members moved by the cylinder. A second set of valves 72 and 73 is provided for the pin-setting machine A, and these sets of valves may be duplicated for each additional pin-setting machine in the establishment.

In order to facilitate the operation, counters may be provided for counting the pins transferred out and transferred in a pinsetting machine. As shown in FIG. 1, a counter 75, having a pin operated blade 76, is contacted by pins passing down the transfer-out chute 10 to provide a count on an indicator 77 in the pin storage area S. The parts may be connected by lines 77a and 77b and are of a type wherein each time the blade 76 is depressed a switch is closed to step the indicator 77. A similar counter 78 may be operated by the swinging gate 55 as pins enter the pinsetting machine to provide a count on the indicator 79 in the pin storage area S. A pair of lines 79a and 79b connect the counter 78 and indicator 79. These counters may be duplicated for each machine.

A button panel 80 may be provided in the storage area S for controlling a motor 81 which drives a drive belt 82 for the pin elevator 4 to start and stop the pin elevator as desired. Also, a button 83 may be provided to close a circuit including a solenoid 84 for cycling the pinsetter (not shown) through a new-set operation when it is necessary to direct a second set of pins into an alley pit and to the pin elevator for their subsequent transfer out of use from the machine.

In operation, an attendant in the storage area S may operate the control valve 70 to position the pin diverter 6 in pin transfer-out position, as shown in FIG. 3, and the machine may be cycled a desired number of times by operation of button 83 to cause all pins associated with a machine to travel down the chute 10 onto upper conveyor flight 11 for transport into box 21 in the storage area S. The valve 70 is then shifted to restore the diverter member 6 to its pin forwarding position, as shown in FIG. 4, and the control 71 is operated to open the trap door 37 and position the pin deflector 43 across the path of travel of pins along the lower conveyor flight 25. Pins that have been suitably stored in the storage area S may then be dumped onto chute 60 which directs the pins to the lower conveyor flight 25, and, at the machine B, the pins are engaged by the deflector 43 to move out on the shelf formed by the trap door 37 into the plane of the pin elevator 4 for elevation and use in the machine. The control valve 71 may then be operated to close the trap door 37 and lower the pin deflector 43 after the desired number of pins has entered the machine, and the foregoing operation is then repeated for the machine A and subsequent machines along the line of pinsetters.

I claim:

1. A pin changing mechanism for use with a plurality of pinsetting machines comprising, means for discharging pins out of each of said machines, means for discharging pins into each of said machines, a conveyor extending along the rear of said plurality of machines and associated with both said means for carrying pins toward the machines from a pin storage area remote from the machines in one operation and in another operation carrying pins toward the pin storage area from the machines, and means including manually operable controls for selectively operating said first and second-mentioned means of each machine independently.

2. A pin changing mechanism for use with a plurality of pinsetting machines comprising, a pin storage area remote from the machines, means for discharging pins out of each of said machines, means for discharging pins into each of said machines, a conveyor extending along the rear of said plurality of machines and to the pin storage area and associated with both said means for carrying pins toward and away from the machines and a pin storage area remote from the machines, and a plurality of pin diverting devices disposed along the conveyor with one of said devices being located at each pinsetting machine.

3. In a pin changing mechanism for use with a plurality of pinsetting machines, a pin transporting mechanism extending along the rear of the machines for carrying pins toward and away from the machines and a common pin storage area, means associated with each machine for discharging pins therefrom including a movable pin diverter, a chute positioned adjacent the diverter for directing pins received from the diverter onto the pin transport mechanism, means for positioning the diverter to direct pins to said chute, and means for discharging pins from the pin transport mechanism to a machine.

4. A pin changing mechanism as defined in claim 3 wherein the machine has a ring-shaped pin elevating member extending across the rear thereof, and wherein the means for discharging pins out of and into a machine operate to discharge pins through the inner periphery of the elevating member.

5. In a pin changing mechanism for use with a plurality of pinsetting machines, a pin transporting mechanism extending along the rear of the machines for carrying pins toward and away from the machines and a common pin storage area, means associated with each machine for discharging pins therefrom including a movable diverter for receiving pins in their normal path of travel in the machine, a chute positioned adjacent the diverter for directing pins received from the diverter onto one element of the pin transport mechanism, means for positioning the diverter to direct pins to said chute and means for discharging pins from another element of the pin transport mechanism to a machine including a member movable into the path of pins traveling on the pin transport mechanism for directing pins from said mechanism into a machine, and means for positioning the deflector in the path of pin travel.

6. A pin transfer-out mechanism for use with a bowling pinsetting machine having a ring-shaped pin elevator extending across the rear thereof and a pan adapted to direct a pin from the elevator to another machine component comprising, a conveyor at the rear of the machine having a flight traveling toward a pin storage area for transporting pins transferred from the machine to said area, means for discharging pins out of the machine into said conveyor comprising, means mounting the pan for movement to a pin diverting position positioned at least partly within the periphery of the pin elevator for diverting pins toward said conveyor flight as they are discharged from the pin elevator, means for moving the pan to said position, and control means in the storage area for said moving means.

7. A pin changing apparatus for use with a plurality of pinsetting machines comprising, a conveyor extending along the rear of said machines and extending to a pin storage area with an upper flight traveling toward the area and a lower flight traveling from the area, pin guiding walls associated with the lower flight to maintain pins on said lower flight, means defining an opening in one of said guide walls at each machine through which pins may pass from the lower conveyor flight to the adjacent machine, and a trap door for each opening movable between a position blocking the opening and a position clear of the opening extending downwardly toward the machine to form a shelf along which pins may move from the lower conveyor flight into the machine.

8. A pin changing mechanism for use in an establishment having a plurality of pinsetting machines each having pin elevating means adjacent the rear thereof and a pin storage area remote from the machines comprising, an endless conveyor extending from said area and along the rear of the machines, means associated with each machine for discharging pins therefrom to the upper flight of the conveyor traveling toward the area including a pivotally mounted diverter for receiving pins from the pin elevating means, a piston and cylinder device for positioning the diverter, means associated with each machine for discharging pins from the lower conveyor flight traveling from the pin storage area into the machine including a pin deflector movable to a position extending across the lower flight of the conveyor, a piston and cylinder device for moving the pin deflector to said position, means associated with each machine including control valves in the storage area for operating the piston and cylinder devices, and counting means associated with each machine including indicators in the storage area for counting pins entering and leaving each machine.

9. A pin changing mechanism for use in an establishment having a plurality of pinsetting machines each having a ring-shaped pin elevator at the rear thereof and a pin storage area remote from the machines comprising, an endless conveyor extending from said area and along the rear of the machines, a chute in said area for directing pins onto the lower flight of the conveyor traveling away from the area, means in said area for receiving pins discharged from the upper flight of the conveyor traveling toward the area, means associated with each machine for discharging pins therefrom including a pivotally mounted diverter movable to a rearwardly and downwardly inclined position extending through the plane of the pin elevating ring, a chute for guiding pins from the diverter to the upper conveyor flight, a piston and cylinder device for positioning the diverter, means associated with each machine for discharging pins from the lower conveyor flight into the machine including a pin deflector movable to a position extending across the lower flight of the conveyor, a piston and cylinder device for moving the pin deflector to said position, means associated with each machine including manually operable control valves in the storage area for operating the piston and cylinder devices, and counting means associated with each machine including indicators in the storage area for counting pins entering and leaving each machine.

10. A pin changing system for a plurality of bowling alleys each having an automatic pinsetter comprising, in combination, a pin storage area removed from said pinsetters, a traveling conveyor extending horizontally from the storage area and across the rear of said pinsetters, means for moving the conveyor so that the upper reach travels to the storage area to carry pins transferred out of use from the pinsetters to said area and the lower reach travels from the storage area to carry pins to be placed in use to the pinsetters, selectively operable means associated with each pinsetter for discharging rearwardly from the pinsetter pins that are transferred out of use onto the upper reach of the conveyor, selectively operable means associated with the lower reach of the conveyor at each of said pinsetters for diverting pins to be placed in use off the conveyor and into a pinsetter, control means at the storage area for effecting operation of the pin discharging means at a pin setter to remove therefrom a complement of pins and for effecting operation of the pin diverting means at the last-referred-to pinsetter to place a different complement of pins in the pinsetter.

11. A pin changing mechanism for use with a bowling pinsetting machine having a ring-shaped pin elevator extending across the rear thereof comprising, a conveyor at the rear of the elevator for receiving pins transferred from the machine, means for discharging pins out of the elevator rearwardly into said conveyor comprising a movable pin diverter having a rearwardly and downwardly inclined position within the periphery of the pin elevator and within the plane thereof for directing pins toward the conveyor, and means for maintaining said diverter in said position.

12. A pin changing system for a plurality of bowling alleys each having an automatic pinsetter comprising, in combination, a pin storage area removed from said pinsetters, a traveling conveyor extending horizontally from the storage area and across the rear of said pinsetters, means for moving the conveyor so that one reach travels to the storage area to carry pins transferred out of use from the pinsetters to said area and another reach travels from the storage area to carry pins to be placed in use to the pinsetters, selectively operable means associated with each pinsetter for discharging rearwardly from the pinsetter pins that are transferred out of use onto the one reach of the conveyor, selectively operable means associated with the other reach of the conveyor at each of said pinsetters for diverting pins to be placed in use off the conveyor and into a pinsetter, control means at the storage area for effecting operation of the pin discharging means at a pinsetter to remove therefrom a complement of pins and for effecting operation of the pin diverting means at the last-referred-to pinsetter to place a different complement of pins in the pinsetter.

References Cited in the file of this patent

UNITED STATES PATENTS

| Number | Name | Date |
|---|---|---|
| 709,163 | Lahr | Sept. 16, 1902 |
| 2,621,045 | Montooth | Dec. 9, 1952 |
| 2,625,397 | Frye | Jan. 13, 1953 |
| 2,636,622 | Saxe | Apr. 28, 1953 |
| 2,711,318 | Schmidt | June 21, 1955 |
| 2,736,555 | Fluke | Feb. 28, 1956 |
| 2,786,679 | Strauss et al. | Mar. 26, 1957 |
| 2,794,535 | Hauschild et al. | June 4, 1957 |